United States Patent
Shang

(10) Patent No.: US 10,292,124 B2
(45) Date of Patent: May 14, 2019

(54) METHOD AND DEVICE FOR CONNECTING TO 4G NETWORK AND TERMINAL EQUIPMENT

(71) Applicant: Guangdong Oppo Mobile Telecommunications Corp., Ltd., Dongguan, Guangdong (CN)

(72) Inventor: Gaozhan Shang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/797,301

(22) Filed: Oct. 30, 2017

(65) Prior Publication Data

US 2018/0270779 A1    Sep. 20, 2018

(30) Foreign Application Priority Data

Mar. 15, 2017    (CN) .......................... 2017 1 0154276

(51) Int. Cl.
*H04W 48/06*    (2009.01)
*H04W 60/04*    (2009.01)
(Continued)

(52) U.S. Cl.
CPC .......... *H04W 60/04* (2013.01); *H04W 48/06* (2013.01); *H04W 48/16* (2013.01); *H04W 48/18* (2013.01);
(Continued)

(58) Field of Classification Search
CPC ..... H04W 48/16; H04W 48/18; H04W 88/06; H04W 48/06; H04W 48/20; H04W 60/04;
(Continued)

(56) References Cited

U.S. PATENT DOCUMENTS

| 9,661,571 B2 * | 5/2017 | Iwai | H04W 76/38 |
| 2012/0307793 A1 * | 12/2012 | Taneja | H04W 36/02 |
| | | | 370/331 |

(Continued)

FOREIGN PATENT DOCUMENTS

| CN | 102300285 A | 12/2011 |
| CN | 103797850 A | 5/2014 |

(Continued)

OTHER PUBLICATIONS

International Search Report issued in corresponding International Application No. PCT/CN2017/108399 dated Jan. 5, 2018 (13 pp).

(Continued)

*Primary Examiner* — Timothy X Pham
(74) *Attorney, Agent, or Firm* — Young Basile Hanlon & MacFarlane, P.C.

(57) ABSTRACT

Provided are a method for connecting to a 4G network, a device for connecting to a 4G network, and a terminal equipment. The method includes the follows: a terminal equipment judges whether the terminal equipment is currently registered in 4G; if the terminal equipment is not currently registered in 4G, whether a radio resource (RR) state is an idle state is judged; if the RR state is a non-idle state, a first duration in which the terminal equipment is in the non-idle state is determined; and if the first duration exceeds a first time threshold, the RR state is released to the idle state to cause the terminal equipment to re-select to connect to the 4G network.

14 Claims, 4 Drawing Sheets

(51) Int. Cl.
*H04W 48/18* (2009.01)
*H04W 48/16* (2009.01)
*H04W 48/20* (2009.01)
*H04W 74/08* (2009.01)
*H04W 88/06* (2009.01)

(52) U.S. Cl.
CPC ........ *H04W 48/20* (2013.01); *H04W 74/0833* (2013.01); *H04W 88/06* (2013.01)

(58) Field of Classification Search
CPC ....... H04W 74/0833; H01L 2924/0002; H01L 2924/00; B60K 2350/206; B60K 35/00; B60Q 3/14; F16H 2063/423; F16H 59/02; F16H 63/42; G09F 13/04; G09F 2013/044
USPC ...................................................... 455/435.2
See application file for complete search history.

(56) References Cited

U.S. PATENT DOCUMENTS

| | | | |
|---|---|---|---|
| 2013/0070728 A1 | 3/2013 | Umatt et al. | |
| 2015/0094065 A1* | 4/2015 | Su | H04W 36/30 455/436 |
| 2016/0050600 A1* | 2/2016 | Bhattacharjee | H04W 76/38 455/436 |
| 2016/0095027 A1* | 3/2016 | Taneja | H04W 36/02 370/331 |
| 2016/0119858 A1* | 4/2016 | Liu | H04W 48/16 455/434 |
| 2016/0330656 A1 | 11/2016 | Kim et al. | |
| 2017/0019938 A1* | 1/2017 | Salkintzis | H04W 8/186 |
| 2017/0196043 A1* | 7/2017 | Lindoff | H04W 60/06 |
| 2017/0251415 A1* | 8/2017 | Taneja | H04W 76/10 |

FOREIGN PATENT DOCUMENTS

| | | |
|---|---|---|
| CN | 104640177 A | 5/2015 |
| CN | 105338584 A | 2/2016 |

OTHER PUBLICATIONS

Qualcomm Inc, "Avoid UEs Staying in RRC Connected State Unnecessarily", 3GPP Draft, 3rd Generation Partnership Project(3GPP), Mobile Competence Centre; vol. RAN WG2, No. Kaohsiung,Taiwan.

NTT Docomo et al, "Introduction of user inactivity timer", 3GPP Draft, 3rd Generation Partnership Project (3GPP), Mobile Competence Centre; vol. RAN WG2, No. Athens, Greece.

Partial European search report issued in corresponding European application No. 17201257.7 dated Apr. 24, 2018.

* cited by examiner

METHOD AND DEVICE FOR CONNECTING TO 4G NETWORK AND TERMINAL EQUIPMENT

CROSS-REFERENCE TO RELATED APPLICATION

This application claims priority to Chinese patent application no. 201710154276.9, filed on Mar. 15, 2017, the content of which is herein incorporated by reference in its entirety.

TECHNICAL FIELD

The present disclosure relates to the field of communication technology, and particularly to a method for connecting to a 4G network, a device for connecting to a 4G network and a terminal equipment.

BACKGROUND

With the development of the fourth-generation (4G) mobile communication technology, whether a terminal equipment (for example, a mobile phone) can use 4G technology and the ability of the terminal equipment to use 4G technology are gaining more and more people's attention. In product testing or actual use of a user, it has been found that, the mobile phone resides in a 2G (2th-Generation) network or a 3G (3th-Generation) network for a long time and cannot re-select to connect to the 4G network even if the design of the mobile phone supports 4G technology and a 4G network of the environment in which the mobile phone is located is in a good condition.

Thus, Internet services provided by the terminal equipment cannot meet requirements of users, and user experience is poor.

BRIEF DESCRIPTION OF THE DRAWINGS

Other features, objects, and advantages of the present disclosure will become more apparent by reading and referring to detailed descriptions of non-limiting implementations which are made with reference to the following drawings.

DETAILED DESCRIPTION

Figure 1:
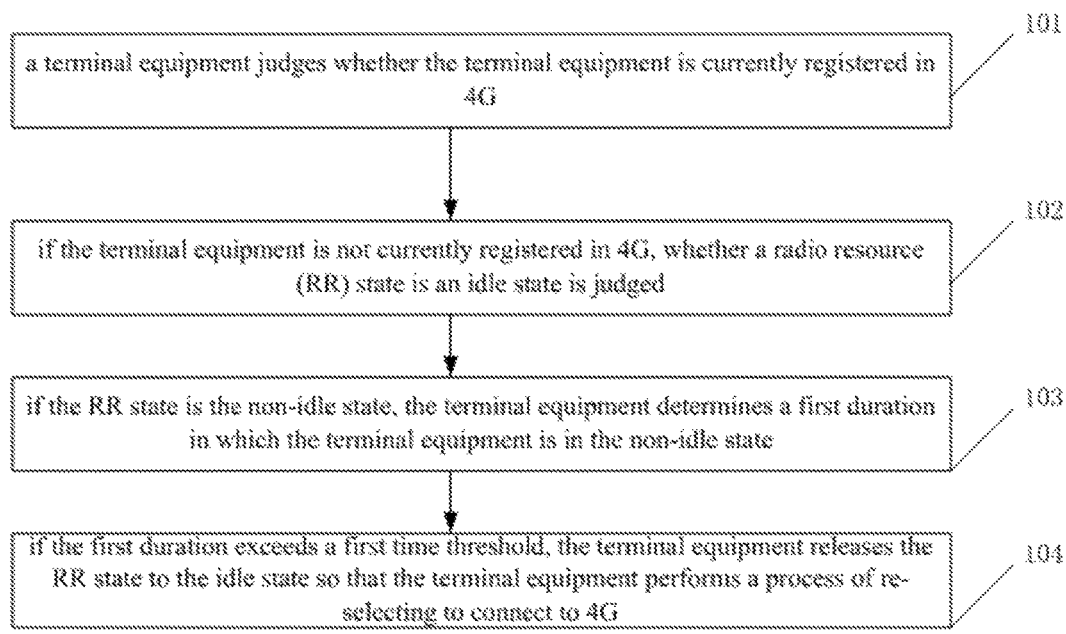
FIG. 1 is a flowchart of a method for connecting to a 4G network according to an implementation of the present disclosure.

Before discussing exemplary implementations in more detail, it should be mentioned that, some exemplary implementations are described as a process or a method depicted by a flow chart. Although the flowchart describes operations as a sequential process, many of the operations may be implemented in parallel, concurrently or simultaneously. In addition, the order of the operations may be re-arranged. The process may be terminated when their operations are completed, but may also have additional steps which are not included in the accompanying drawings. The process may correspond to a method, a function, a procedure, a subroutine, a sub-program and the like.

The "computer device" herein, also known as "computer," refers to a smart electronic device that may perform a predetermined processing procedure such as a numerical calculation and/or a logical calculation by running a predetermined program or instruction, which may include a processor and a memory, such that the predetermined processing process is executed by executing an existence instruction pre-stored in the memory by the processor, or the predetermined processing process is implemented by a hardware such as ASIC, FPGA, and DSP, or the predetermined processing process is implemented by a combination thereof. The computer device includes, but not limited to, a server, a personal computer, a laptop, a tablet computer, and a smartphone, etc.

The methods discussed infra (some of which are illustrated through flowcharts) may be implemented through hardware, software, firmware, middleware, microcode, hardware description language or any combination thereof. When they are implemented through software, firmware, middleware or microcode, a program code or a code segment for implementing essential tasks may be stored in a machine or a computer readable medium (e.g. a storage medium). One or more processors may implement essential tasks.

The specific structures and functional details disclosed herein are only representatives, and for a purpose of describing the exemplary implementations of the present disclosure. But the present disclosure may be further implemented through many alternative forms, and it should not be interpreted that the present disclosure is only limited to the implementations illustrated herein.

It should be understood that although terms "first," "second" and the like might be used herein to describe respective units, these units should not be limited by these terms. Use of these terms is only for distinguishing one unit from another. For example, without departing from the scope of the exemplary implementations, a first unit may be referred to as a second unit, and similarly, the second unit may be referred to as the first unit. The term "and/or" used herein includes any and all combinations of one or more associated items as listed.

The terms used herein are only for describing specific implementations, not intended to limit exemplary implementations. Unless otherwise indicated clearly, singular forms "a" or "one" used herein further intends to include plural forms. It should also be appreciated that the terms "comprise" and/or "include" used herein prescribe existence of features, integers, steps, operations, units and/or components as stated, but do not exclude existence or addition of one or more other features, integers, steps, operations, units, components, and/or a combination thereof.

It should also be noted that in some alternative implementations, functions/actions as mentioned may occur in an order different from what is indicated in the accompanying drawings. For example, dependent on the functions/actions involved, two successively illustrated diagrams may be executed substantially simultaneously or in a reverse order sometimes.

In the following, some of the terms used herein are explained to facilitate the understanding for those skilled in the art.

Terminal Equipment

Terminal equipment, also known as a terminal, a terminal device, or user equipment (UE), means an electronic device that provides voice and/or data connectivity to a user, examples of which can be hand-held devices with wireless connectivity function, on-board devices or the like. Common terminals can be, for example, mobile phones, tablets, laptops, handheld computers, mobile internet devices (MID), or wearable equipment such as smart watches, smart bracelets, and pedometers or others. Terminal equipment in the present disclosure is not only limited to the common terminal, but can also be an automated teller machine (ATM), a ticket machine, an entrance guard machine, medical equipment, or other terminal able to connect to a 4G network.

4G 4G is the abbreviation of the fourth-generation mobile communication technology, which is a more advanced network format compared with 2G (2th-Generation) and 3G (3th-Generation). 4G includes both TD-LTE and FDD-LTE systems, which can transmit data, audio, video, and images with higher speed. Specifically, compared with 3G, 4G has higher transmission rate, lower wireless network delay, better mobility and more extensive network coverage. Thus, a 4G network is a prior choice for a terminal equipment, then followed by 3G and 2G networks.

The present disclosure will be described in further detail with reference to the accompanying drawings.

According to an aspect of the present disclosure, a method for connecting to a 4G network is provided, which is realized by a terminal equipment, and the terminal equipment may be a smart device, such as a mobile phone, a tablet computer, a smartwatch, a smart hand ring, a personal digital assistant and the like. The method is illustrated in FIG. 1 and can begin at block 101.

At block 101, a terminal equipment judges whether the terminal equipment is currently registered in 4G.

The 4G in the above-described block may specifically be long term evolution (LTE), and of course, in practical application, it may be other 4G standards.

As an alternative implementation, a registration state of the terminal equipment can be acquired, and network information registered by the terminal equipment is extracted from the registration state, thus whether the terminal equipment is currently registered in a 4G network is determined.

At block 102, if the terminal equipment is not currently registered in 4G, whether a radio resource (RR) state is an idle state is judged.

As an alternative implementation, the RR state includes the idle state and a non-idle state.

As an alternative implementation, if the RR state is the idle state, a state of a first timer is further determined, and if the first timer has been started, the first timer is stopped and zeroed.

At block 103, if the RR state is the non-idle state, the terminal equipment determines a first duration in which the terminal equipment is in the non-idle state.

A method to realize the above-described block 103 may be, if the RR state is the non-idle state, the terminal equipment determines whether the first timer has been started; if the first timer has been started, the time of the first timer is extracted as the first duration; if the first timer has not been started, the terminal equipment starts the first timer, and a timing time after the first timer is started is the first duration.

At block 104, if the first duration exceeds a first time threshold, the terminal equipment releases the RR state to the idle state so that the terminal equipment performs a process of re-selecting to connect to 4G.

In implementations of the present disclosure, the terminal equipment releases the RR state to the idle state, which is to say, the terminal equipment converts the RR state form the non-idle state to the idle state.

However, if having performed the process of re-selecting to connect to 4G, the terminal equipment may still not be able to access the 4G network successfully. In this situation, a time (i.e. a second duration) after the terminal equipment releases the RR state to the idle state may be recorded, and if the second duration exceeds a preset second time threshold, the block 101 is performed again to determine whether the terminal equipment has accessed the 4G network successfully; if the terminal equipment has not accessed the 4G network, proceeding with the process described in FIG. 1 until the terminal equipment accesses to the 4G network successfully.

Further, if the steps shown in 101 to 104 are re-executed, the first time threshold may be modified to a third time threshold, and the third time threshold is greater than the first time threshold, thereby avoiding that the terminal equipment to initiate a re-selecting operation too fast leads to searching the network a number of times in a short time, which causes excessive power consumption.

Technical solutions according to the present disclosure release the RR state to the idle state when the terminal equipment is in 2G or 3G state for a long time, so that the terminal equipment can perform the process of re-selecting to connect to 4G, thus the terminal equipment is allowed to enter the 4G network, therefore it has advantages of meeting the needs of users to access the internet and improving user experience.

Figure 2:
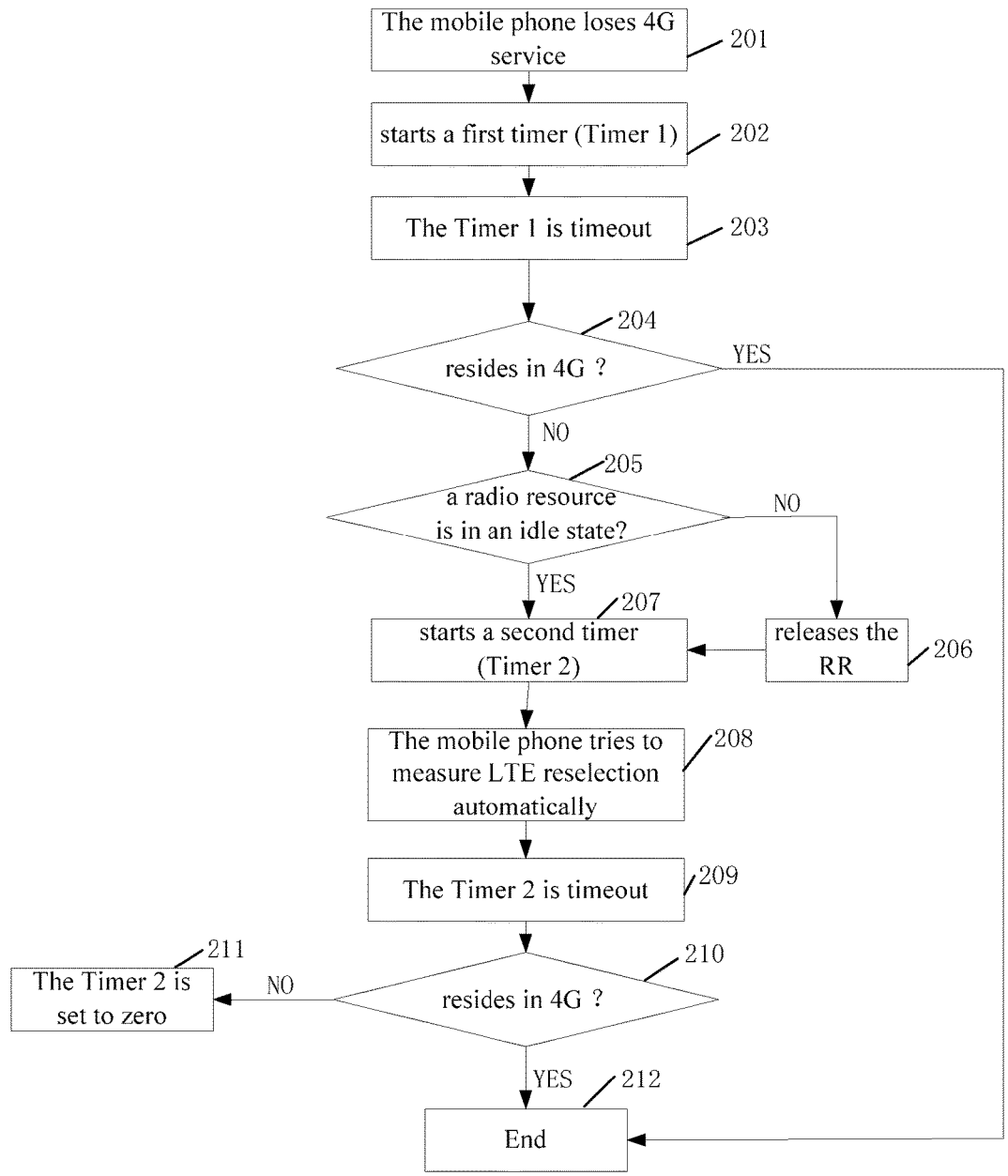
FIG. 2 is a flowchart of another method for connecting to a 4G network according to an implementation of the present disclosure.

FIG. 2 illustrated a method for connecting to a 4G network according to the present application. In implementations of the present disclosure, description is conducted by taking a mobile phone as the example of a terminal equipment. The method is illustrated in FIG. 2, and can begin at block 201

At block 201, the mobile phone loses 4G service.

At block 202, the mobile phone starts a first timer (Timer 1).

At block 203, the Timer 1 is a timeout.

At block 204, the mobile phone determines whether itself resides in 4G; if YES, proceeds to block 212, if NOT, proceeds to block 205.

At block 205, the mobile phone determines whether a radio resource (RR) is in an idle state, if NOT, proceeds to block 206; if YES, proceeds to block 207.

At block 206, the mobile phone releases the RR, proceeds to block 207.

At block 207, the mobile phone starts a second timer (Timer 2).

At block 208, the mobile phone tries to measure LTE reselection automatically.

At block 209, the Timer 2 is a timeout.

At block 210, the mobile phone determines whether itself resides in 4G; if YES, proceeds to block 212, if NOT, proceeds to block 211.

At block 211, the Timer 2 is set to zero.

At block 212. End.

Technical solutions according to the present disclosure release the RR state to the idle state when the terminal equipment is in 2G or 3G state for a long time, so that the terminal equipment can perform the process of re-selecting to connect to 4G, thus the terminal equipment is allowed to enter the 4G network, therefore it has advantages of meeting the needs of users to access the internet and improving user experience.

Figure 3:
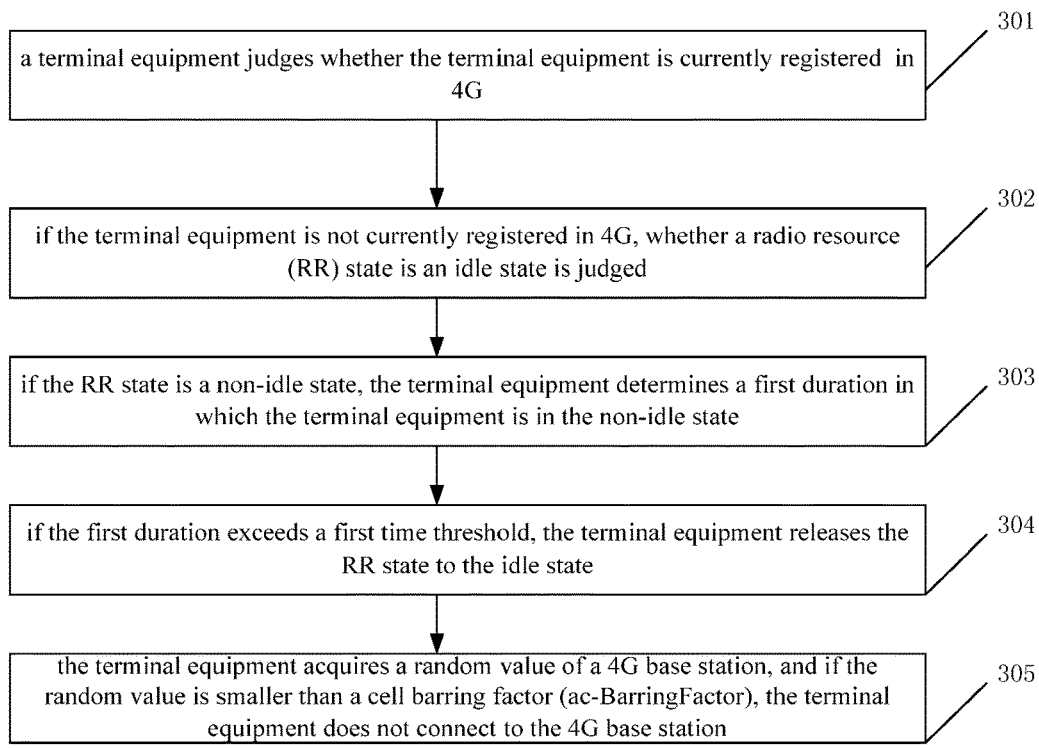
FIG. 3 is a flowchart of another method for connecting to a 4G network according to an implementation of the present disclosure.

FIG. 3 illustrated a method for connecting to a 4G network according to the present application. The method is executed by a terminal equipment. The method is illustrated in FIG. 3, and can begin at block 301.

At block 301, a terminal equipment judges whether the terminal equipment is currently registered in 4G.

The 4G in the above-described block may specifically be long term evolution (LTE), and of course, in practical application, it may be other 4G standards.

At block 302, if the terminal equipment is not currently registered in 4G, whether a radio resource (RR) state is an idle state is judged.

At block 303, if the RR state is a non-idle state, the terminal equipment determines a first duration in which the terminal equipment is in the non-idle state.

A method to realize the above-described block 303 may be, if the RR state is the non-idle state, the terminal equipment determines whether the first timer has been started; if the first timer has been started, the time of the first timer is extracted as the first duration; if the first timer has not been started, the terminal equipment starts the first timer, and a timing time after the first timer is started is the first duration.

At block 304. if the first duration exceeds a first time threshold, the terminal equipment releases the RR state to the idle state.

At block 305, the terminal equipment acquires a random value of a 4G base station, and if the random value is smaller than a cell barring factor (ac-BarringFactor), the terminal equipment does not connect to the 4G base station.

In technical solutions according to the present disclosure, the terminal equipment does not connect to the 4G base station if the random value of the 4G base station is smaller than the cell barring factor, so that a duplication of connecting to 4G base stations is avoided.

Figure 4:
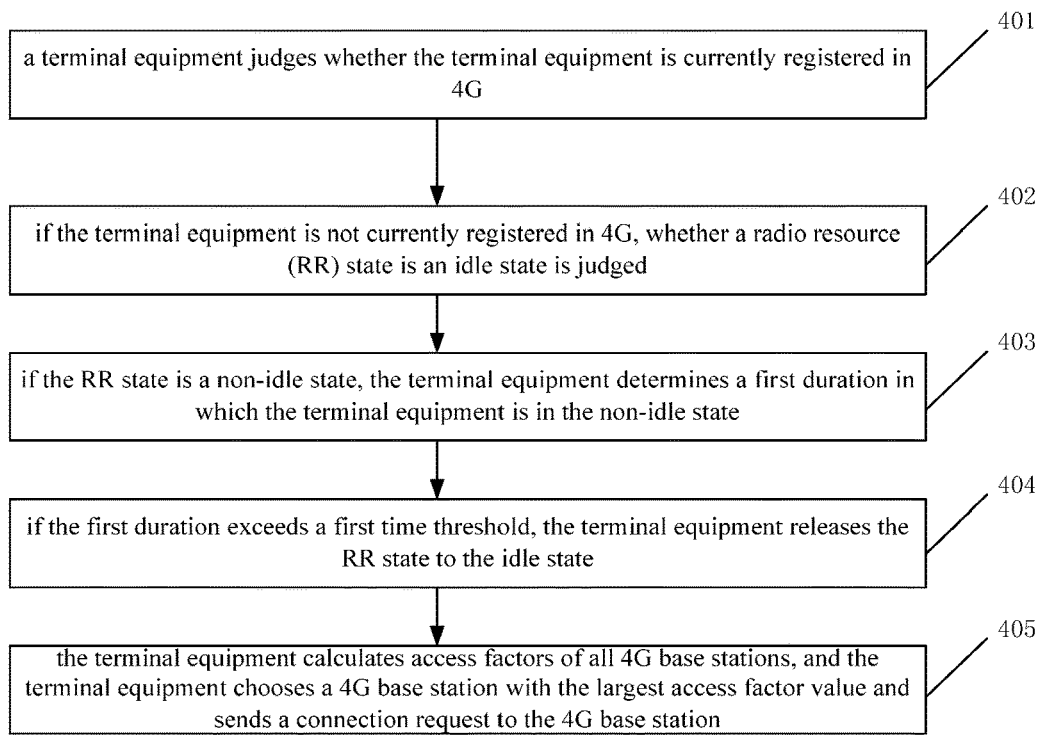
FIG. 4 is a flowchart of another method for connecting to a 4G network according to an implementation of the present disclosure.

FIG. 4 illustrated a method for connecting to a 4G network according to the present application. The method is executed by a terminal equipment. The method is illustrated in FIG. 4, and can begin at block 401.

At block 401, a terminal equipment judges whether the terminal equipment is currently registered in 4G.

The 4G in the above-described block may specifically be long term evolution (LTE), and of course, in practical application, it may be other 4G standards.

At block 402, if the terminal equipment is not currently registered in 4G, whether a radio resource (RR) state is an idle state is judged.

At block 403, if the RR state is a non-idle state, the terminal equipment determines a first duration in which the terminal equipment is in the non-idle state.

A method to realize the above-described block 403 may be, if the RR state is the non-idle state, the terminal equipment determines whether a first timer has been started; if the first timer has been started, the time of the first timer is extracted as the first duration; if the first timer has not been started, the terminal equipment starts the first timer, and a timing time after the first timer is started is the first duration.

At block 404, if the first duration exceeds a first time threshold, the terminal equipment releases the RR state to the idle state.

At block 405, the terminal equipment calculates access factors of all 4G base stations, and the terminal equipment chooses a 4G base station with the largest access factor value and sends a connection request to the 4G base station.

In at least one implementation, a computing method of the above-described access factors may be:

$$X1 = \frac{\sum_{M}^{n=1} S1_n}{\left(\sum_{M}^{n=1} S1_n + \sum_{M}^{n=1} S2_n + \ldots \sum_{M}^{n=1} SL_n\right)/L} + \frac{\sum_{M}^{n=1} W1_n}{\left(\sum_{M}^{n=1} W1_n + \sum_{M}^{n=1} W2_n + \ldots \sum_{M}^{n=1} WL_n\right)/L}$$

wherein, $X1$ is an access factor of a first base station, $S1_n$ is a network speed value sampled by the first base station for the $n^{th}$ time, $S2_n$ is a network speed value sampled by a second base station for the $n^{th}$ time, $SL_n$ is a network speed value sampled for the $n^{th}$ time by the $L^{th}$ base station, $M$ is a total number of times of sampling, $L$ is a total number of base stations, $W1_n$ is a number of terminals accessing the first base station when the first base station samples for the $n^{th}$ time, $W2_n$ is a number of terminals accessing the second base station when the second base station samples for the $n^{th}$ time, $WL_n$ is a number of terminals accessing the $L^{th}$ base station when the $L^{th}$ base station samples for the $n^{th}$ time.

Figure 5:
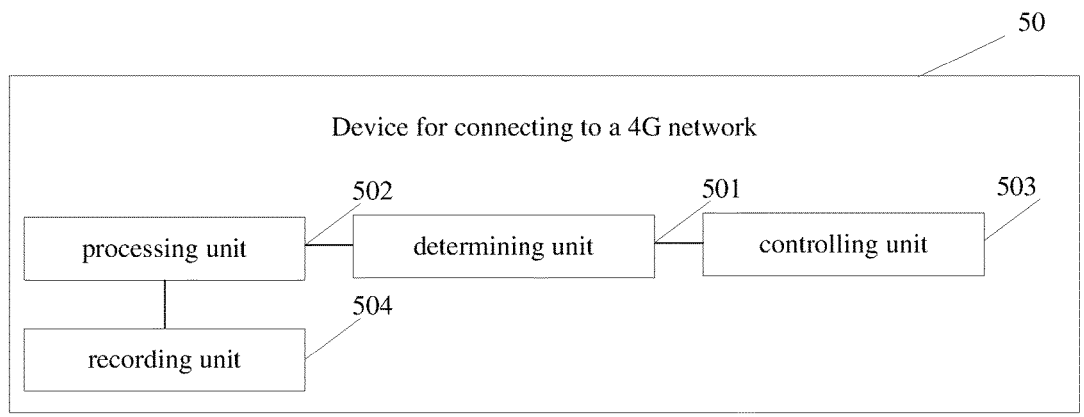
FIG. 5 is a structure diagram of a device for connecting to a 4G network according to an implementation of the present disclosure.

FIG. 5 illustrates a device 50 for connecting to a 4G network according to the present application. The device includes the follows.

A determining unit 501, which is configured to judge whether a terminal equipment is currently registered in 4G, if it is judged that the terminal equipment is not currently registered in 4G, judge whether a radio resource (RR) state is an idle state. The determining unit 501 may be a processor.

A processing unit 502, which is configured to determine, if the RR state is a non-idle state, a first duration in which the terminal equipment is in the non-idle state; release, if the first duration exceeds a first time threshold, the RR state to the idle state so that the terminal equipment re-selects to connect to a 4G network. The processing unit 502 may be a processor.

In at least one implementation, the processing unit is further configured to determine, if the RR state is the non-idle state, whether a first timer has been started; extract, if the first timer has been started, the time of the first timer as the first duration; and start, if the first timer has not been started, the first timer, wherein a timing time after the first timer is started is the first duration.

In at least one implementation, the processing unit is further configured to acquire a random value of a 4G base station, and if the random value is smaller than a cell barring factor (ac-BarringFactor), the terminal equipment does not connect to the 4G base station.

In at least one implementation, the processing unit is further configured to calculate access factors of all 4G base stations, choose a 4G base station with the largest access factor value, and send a connection request to the 4G base station.

In at least one implementation, a computing method of the access factors may be:

$$X1 = \frac{\sum_{M}^{n=1} S1_n}{\left(\sum_{M}^{n=1} S1_n + \sum_{M}^{n=1} S2_n + \ldots \sum_{M}^{n=1} SL_n\right)/L} + \frac{\sum_{M}^{n=1} W1_n}{\left(\sum_{M}^{n=1} W1_n + \sum_{M}^{n=1} W2_n + \ldots \sum_{M}^{n=1} WL_n\right)/L}$$

wherein, X1 is an access factor of a first base station, $S1_n$ is a network speed value sampled by the first base station for the $n^{th}$ time, $S2_n$ is a network speed value sampled by a second base station for the $n^{th}$ time, $SL_n$ is a network speed value sampled for the $n^{th}$ time by the $L^{th}$ base station, M is a total number of times of sampling, L is a total number of base stations, $W1_n$ is a number of terminals accessing the first base station when the first base station samples for the $n^{th}$ time, $W2_n$ is a number of terminals accessing the second base station when the second base station samples for the $n^{th}$ time, $WL_n$ is a number of terminals accessing the $L^{th}$ base station when the $L^{th}$ base station samples for the $n^{th}$ time.

In at least one implementation, in terms of judging whether a terminal equipment is currently registered in 4G, the determining unit 501, is further configured to acquire a registration state of the terminal equipment, and judge whether the terminal equipment is currently registered in 4G according to the registration state.

In at least one implementation, the device 50 for connecting to a 4G network further includes a controlling unit 503. The controlling unit 503 is configured to determine, if the RR state is the idle state, whether the first timer has been started; stop the first timer and set the first timer to zero if the first timer has been started. The controlling unit 503 may be a processor.

In at least one implementation, the device 50 for connecting to a 4G network further includes a recording unit 504. The recording unit 504 is configured to record, after the processing unit 502 releases the RR state to the idle state, a second duration since releasing the RR state to the idle state. The recording unit 504 may be a memory.

The determining unit 501, is further configured to perform again, in the case of the second duration exceeding a second time threshold, the operation of judging whether the terminal equipment is currently registered in 4G.

In at least one implementation, the processing unit 502, is further configured to determine, after the determining unit 501 performs the operation of judging whether the terminal equipment is currently registered in 4G again, if the terminal equipment is not registered in 4G and the RR state is the non-idle state, a third time in which the terminal equipment is in the non-idle state.

The processing unit 502, is further configured to release, if the third time exceeds a third time threshold, the RR state to the idle state; wherein, the third time threshold is larger than the first time threshold.

In implementations of the present disclosure, the determining unit 501, the processing unit 502, and the controlling unit 503 may be a processor; and the recording unit 504 may be a memory.

Details in implementations of the present disclosure and without departing from the spirit and fundamental characteristics of the present disclosure, can realize the present disclosure in other specific manners. Therefore, no matter from which point of view, the implementations should be perceived as exemplary and with no limitations. The scope of the present disclosure is limited by the accompanying claims instead of the above description, so that it intends to let all changes that fall into meanings and the scope of equivalent key elements of the claims be included in the present disclosure. Any marks of accompanying drawings in claims should not be regarded as a limitation of the claims. Additionally, it is evident that the word "include/including" does not exclude the presence of other units or steps, and the singular reference does not exclude a plurality. A number of units or devices described in system claims may also be implemented in software or hardware by a single unit or device. First, second and other words are used to express the name, and do not express any particular order.

Flowcharts and block diagrams in the accompanying drawings illustrate architectures, functions, and operations of possible implementations of systems, methods and computer program products according to a number of implementations of the present disclosure. In this regard, each block in flowcharts or block diagrams may represent a module, program segment, or portion of code, which includes one or more executable instructions for implementing a specified logical function. It should also be noted that, in some alternative implementations, functions noted in the block may occur out of the order noted in the accompanying drawings. For example, two blocks shown in succession may, in fact, be executed substantially concurrently, or the blocks may sometimes be executed in the reverse order, depending on the functions involved. It will also be noted that each block of the block diagrams and/or flowcharts, and combinations of blocks in the block diagrams and/or flowcharts, can be implemented by specialized hardware-based systems that perform specified functions or acts, or be implemented by combinations of specialized hardware and computer instructions.

Figure 6:
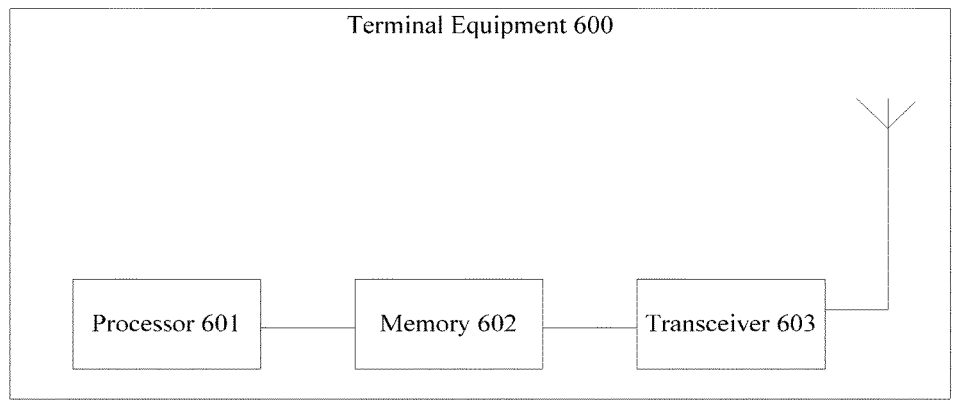
FIG. 6 is a schematic diagram of a hardware structure of a terminal equipment according to an implementation of the present disclosure.

FIG. 6 illustrates a terminal equipment 600 according to implementations of the present disclosure. The terminal equipment 600 includes, but is not limited to: a smartphone, a smartwatch, a tablet computer, a personal computer, a laptop, or a computer group. As shown in FIG. 6, the terminal equipment 600 includes: a processor 601, a memory 602, and a transceiver 603. The transceiver 603 is configured to send and receive data with external apparatuses. The number of processors 601 in the terminal equipment 600 may be one or more. In some implementations of the present application, the processor 601, the memory 602, and the transceiver 603 may be connected via a bus system or other manners. The terminal equipment 600 may be configured to perform methods shown in FIG. 1, FIG. 2, FIG. 3, and FIG. 4. As for meanings and examples of terms referred in the present implementation, reference may be made to descriptions corresponding to FIG. 1, FIG. 2, FIG. 3, and FIG. 4, which would not be repeated herein.

Program codes are stored in the memory 602. The processor 601 is configured to invoke the program codes stored in the memory 602 for executing the blocks shown in FIG. 1, FIG. 2, FIG. 3, and FIG. 4.

It should be noted that the processor 601 herein may be a central processing unit (CPU), an application specific integrated circuit (ASIC), or one or more integrated circuits configured to implement the implementations of the present application, such as one or more digital signal processors (DSP), or, one or more field programmable gate array (FPGA).

The memory 602 may be a storage device, or may be a common name of a number of storage elements, and is configured to store executable program codes, or parameters, data and the like that required by an application program running device to run. And the memory 602 may include a random access memory (RAM), or may include a non-volatile memory such as a disk memory, a flash memory, and the like.

Figure 7:
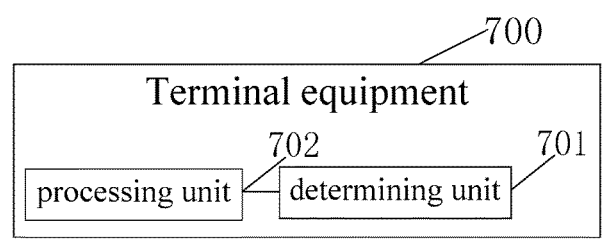
FIG. 7 is a schematic diagram of a terminal equipment according to an implementation of the present disclosure.

FIG. 7 illustrates a terminal equipment 700 according to the present application. The terminal equipment includes the follows.

A determining unit 701, which is configured to judge whether a terminal equipment is currently registered in 4G, if it is judged that the terminal equipment is not currently registered in 4G, judge whether a radio resource (RR) state is an idle state. The determining unit 701 may be a processor.

A processing unit 702, which is configured to determine, if the RR state is a non-idle state, a first duration in which the terminal equipment is in the non-idle state; release, if the first duration exceeds a first time threshold, the RR state to the idle state so that the terminal equipment re-selects to connect to a 4G network. The processing unit 702 may be a processor.

The processing unit 702, which is further configured to acquire a random value of a 4G base station; and to disable the terminal equipment to connect to the 4G base station when the random value is smaller than a cell barring factor.

Persons skilled in the art can understand clearly that, for convenience and brevity of description, detailed working procedures of the systems, devices, and units described above can refer to corresponding procedures in foregoing method implementations, and are not repeated herein.

Understandably, in implementations described herein, the disclosed systems, devices and methods may be implemented in other manners. Device implementations described above are merely illustrative, for example, the division of the units are only for a logical function division and may be divided in a different way in practical implementation; also, for example, multiple units or components may be combined or integrated into another system, or some features may be ignored or not executed. Besides, the coupling, direct coupling or communication connection illustrated or discussed herein may be through indirect coupling or communication connection of communication interfaces, devices or units, which may be electronic, mechanical, or in other forms.

The units described as separate components may be physically separated or not, and the components illustrated as units may be physical units or not, namely, they may be located in one place, or distributed on multiple network units. A part of or all of the units may be selected according to the actual needs to achieve the object of the present implementation.

Besides, each functional unit in each implementation of the present disclosure may be integrated into a processing unit or be physically stand-alone, or two or more of the units be integrated into one unit.

When being implemented as a software function unit and sold or used as a stand-alone product, the functions may be stored in a computer-readable storage medium. Based on this understanding, the essence of technical solutions of the present disclosure, or the part which contributes to the prior art of technical solutions of the present disclosure, or a part of the technical solutions, may be embodied in a form of software product. The computer software product is stored in a computer-readable storage medium and includes several instructions for instructing a computer device (for example, personal computer, server, or network device, etc.) to execute all or part of the steps of methods illustrated by each implementation of the present disclosure. The before-mentioned storage medium includes various media capable of storing program codes, such as a USB flash disk, a mobile hard disk, a read-only memory (ROM), a random access memory (RAM), a magnetic disk, or an optical disk, etc.

Finally, it should be noted that the above implementations are merely intended for describing the technical solutions of the present disclosure other than limiting the present disclosure. Although the present disclosure is described in detail with reference to the foregoing implementations, persons of ordinary skill in the art should understand that they can still make modifications to the technical solutions described in the foregoing implementations, or make equivalent substitutions to part of or all the technical features thereof; while these modifications or substitutions do not depart the essence of corresponding technical solutions from the scope of technical solutions of each implementation of the present disclosure, which shall be within the scope of claims and specification of the present disclosure.

What is claimed is:

1. A method for connecting to a 4G network, comprising:
   acquiring, by the terminal equipment, a registration state of the terminal equipment;
   judging, by the terminal equipment, whether the terminal equipment is currently registered in 4G according to the registration state;
   determining, by a terminal equipment, a radio resource (RR) state when the terminal equipment is not currently registered in 4G, wherein the RR state comprises an idle state and a non-idle state;
   determining, by the terminal equipment, a first duration in which the terminal equipment is in the non-idle state and is not registered in 4G, when the RR state is the non-idle state;
   releasing, by the terminal equipment, the RR state to the idle state to cause the terminal equipment to re-select to connect to the 4G network, when the first duration exceeds a first time threshold;
   recording, by the terminal equipment, a second duration since releasing the RR state to the idle state;
   judging, by the terminal equipment, whether the terminal equipment is currently registered in 4G again, when the second duration exceeds a second time threshold; and
   increasing the first time threshold when the terminal equipment is not currently registered in 4G again.

2. The method of claim 1, wherein determining, by the terminal equipment, the first duration in which the terminal equipment is in the non-idle state comprises:
   determining whether a first timer has been started;
   extracting a time of the first timer as the first duration when the first timer has been started; and
   starting the first timer when the first timer has not been started, wherein a timing time after the first timer is started is the first duration.

3. The method of claim 1, further comprising:
   acquiring, by the terminal equipment, a random value of a 4G base station, wherein the terminal equipment is disabled to connect to the 4G base station when the random value is smaller than a cell barring factor.

4. The method of claim 1, further comprising:
   calculating, by the terminal equipment, access factors of all 4G base stations; and choosing, by the terminal equipment, a 4G base station with the largest access factor value to which a connection request will be sent.

5. The method of claim 4, wherein calculating, by the terminal equipment, the access factors is achieved by:

$$X1 = \frac{\sum\limits_{M}^{n=1} S1_n}{\left(\sum\limits_{M}^{n=1} S1_n + \sum\limits_{M}^{n=1} S2_n + \ldots \sum\limits_{M}^{n=1} SL_n\right)/L} +$$

$$\frac{\sum\limits_{M}^{n=1} W1_n}{\left(\sum\limits_{M}^{n=1} W1_n + \sum\limits_{M}^{n=1} W2_n + \ldots \sum\limits_{M}^{n=1} WL_n\right)/L}$$

wherein, X1 is an access factor of a first base station, $S1_n$ is a network speed value sampled by the first base station for the $n^{th}$ time, $S2_n$ is a network speed value sampled by a second base station for the $n^{th}$ time, $SL_n$ is a network speed value sampled for the $n^{th}$ time by the $L^{th}$ base station, M is a total number of times of sampling, L is a total number of base stations, $W1_n$ is a number of terminals accessing the first base station when the first base station samples for the $n^{th}$ time, $W2_n$ is a number of terminals accessing the second base station when the second base station samples for the $n^{th}$ time, $WL_n$ is a number of terminals accessing the $L^{th}$ base station when the $L^{th}$ base station samples for the $n^{th}$ time.

6. The method of claim 1, further comprising:
determining, by the terminal equipment, whether a first timer has been started, when the RR state is the idle state; and
stopping, by the terminal equipment, the first timer and setting the first timer to zero, when the first timer has been started.

7. A device for connecting to a 4G network, comprising:
a determining unit, configured to:
acquire a registration state of a terminal equipment;
judge whether the terminal equipment is currently registered in 4G according to the registration state;
determine a radio resource (RR) state when the terminal equipment is not currently registered in 4G, wherein the RR state comprises an idle state and a non-idle state;
a processing unit, configured to:
determine a first duration in which the terminal equipment is in the non-idle state and is not registered in 4G, when the RR state is the non-idle state, and
release the RR state to the idle state to cause the terminal equipment to re-select to connect to the 4G network, when the first duration exceeds a first time threshold; and
a recording unit, configured to:
record a second duration since releasing the RR state to the idle state,
wherein the determining unit is further configured to judge again, in the case of the second duration exceeding a second time threshold, whether the terminal is currently registered in 4G, and the processing unit is further configured to increase the first time threshold when the terminal equipment is not currently registered in 4G again.

8. The device of claim 7, wherein the processing unit is further configured to:

determine whether a first timer has been started;
extract a time of the first timer as the first duration, when the first timer has been started; and
start, the first timer when the first timer has not started, wherein a timing time after the first timer is started is the first duration.

9. The device of claim 7, wherein the processing unit is further configured to:
acquire a random value of a 4G base station; and
disable the terminal equipment to connect to the 4G base station when the random value is smaller than a cell barring factor.

10. The device of claim 7, wherein the processing unit is further configured to:
calculate access factors of all 4G base stations; and
choose a 4G base station with the largest access factor value to which a connection request will be sent.

11. The device of claim 10, wherein calculating the access factors is achieved by:

$$X1 = \frac{\sum\limits_{M}^{n=1} S1_n}{\left(\sum\limits_{M}^{n=1} S1_n + \sum\limits_{M}^{n=1} S2_n + \ldots \sum\limits_{M}^{n=1} SL_n\right)/L} +$$

$$\frac{\sum\limits_{M}^{n=1} W1_n}{\left(\sum\limits_{M}^{n=1} W1_n + \sum\limits_{M}^{n=1} W2_n + \ldots \sum\limits_{M}^{n=1} WL_n\right)/L}$$

wherein, X1 is an access factor of a first base station, $S1_n$ is a network speed value sampled by the first base station for the $n^{th}$ time, $S2_n$ is a network speed value sampled by a second base station for the $n^{th}$ time, $SL_n$ is a network speed value sampled for the $n^{th}$ time by the $L^{th}$ base station, M is a total number of times of sampling, L is a total number of base stations, $W1_n$ is a number of terminals accessing the first base station when the first base station samples for the $n^{th}$ time, $W2_n$ is a number of terminals accessing the second base station when the second base station samples for the $n^{th}$ time, $WL_n$ is a number of terminals accessing the $L^{th}$ base station when the $L^{th}$ base station samples for the $n^{th}$ time.

12. The device of claim 7, further comprising a controlling unit configured to:
determine, when the RR state is the idle state, whether a first timer has been started; and
stop the first timer and set the first timer to zero when the first timer has been started.

13. A terminal equipment, comprising:
a determining unit, configured to:
acquire a registration state of a terminal equipment;
judge whether the terminal equipment is currently registered in 4G according to the registration state;
determine a radio resource (RR) state when the terminal equipment is not currently registered in 4G, wherein the RR state comprises an idle state and a non-idle state;
a processing unit, configured to
determine a first duration in which the terminal equipment is in the non-idle state and is not registered in 4G, when the RR state is the non-idle state, and
release the RR state to the idle state to cause the terminal equipment to re-select to connect to a 4G network, when the first duration exceeds a first time threshold; and a recording unit, configured to:
record a second duration since releasing the RR state to the idle state,
wherein the determining unit is further configured to judge again, in the case of the second duration exceeding a second time threshold, whether the terminal equipment is currently registered in 4G, and the processing unit is further configured to increase the first time threshold when the terminal equipment is not currently registered in 4G again.

14. The terminal equipment of claim 13, wherein the processing unit is further configured to:
acquire a random value of a 4G base station; and
disable the terminal equipment to connect to the 4G base station when the random value is smaller than a cell barring factor.

* * * * *